(12) United States Patent
Ross, Jr.

(10) Patent No.: US 7,690,323 B2
(45) Date of Patent: Apr. 6, 2010

(54) GAUGE HEAD ASSEMBLY WITH NON-MAGNETIC INSERT

(75) Inventor: Herbert G. Ross, Jr., Argyle, TX (US)

(73) Assignee: Rochester Gauges, Inc., Dallas, TX (US)

( * ) Notice: Subject to any disclaimer, the term of this patent is extended or adjusted under 35 U.S.C. 154(b) by 4 days.

(21) Appl. No.: 11/931,807

(22) Filed: Oct. 31, 2007

(65) Prior Publication Data

US 2009/0107393 A1   Apr. 30, 2009

(51) Int. Cl.
*G01D 11/24* (2006.01)
*G01D 5/06* (2006.01)

(52) U.S. Cl. ............... 116/305; 116/204; 73/866.1; 73/DIG. 5

(58) Field of Classification Search ............ 116/200, 116/204, 229, 305; 73/866.1, DIG. 5; 403/362, 403/DIG. 1; 411/14, 383
See application file for complete search history.

(56) References Cited

U.S. PATENT DOCUMENTS

| | | | |
|---|---|---|---|
| 23,816 A | 5/1859 | Andrews et al. |
| 20,463 A | 6/1878 | Starkey et al. |
| 251,283 A | 12/1881 | Quinn |
| 447,129 A | 3/1891 | Cooper |
| 521,350 A | 6/1894 | Turner |
| 609,629 A | 8/1898 | Robinson |
| 691,400 A | 1/1902 | Marscher |
| 755,827 A | 3/1904 | Yates et al. |
| 1,141,499 A | 6/1915 | Stahle |
| 1,141,926 A | 6/1915 | Bolin et al. |
| 1,285,570 A | 11/1918 | Schnaier |
| 1,304,022 A | 5/1919 | Cole |
| 1,316,341 A | 9/1919 | Vosika |
| 1,423,411 A | 7/1922 | Finch |
| 1,448,842 A | 3/1923 | Gregory |
| 1,603,239 A | 10/1926 | Gregory |
| 1,617,819 A | 2/1927 | Mabie |
| 1,634,165 A | 7/1927 | Willaims |
| 1,822,735 A | 9/1931 | Hastings |
| 1,899,119 A | 2/1933 | Singer |

(Continued)

FOREIGN PATENT DOCUMENTS

CN   1346963 A1   5/2002

(Continued)

OTHER PUBLICATIONS

Rochester Gauges, Inc., Rochester Industrial Level Gauges Brochure, Aug. 1993, 12 pages.
Rochester Gauges, Inc., EZ-Read TwineSite.TM. Sender Installation/Conversion Technical Data Sheet DS-923, Not Dated, 4 pages.

(Continued)

*Primary Examiner*—Amy Cohen Johnson
(74) *Attorney, Agent, or Firm*—Howison & Arnott, LLP

(57) ABSTRACT

A gauge head assembly for use with a magnetically actuated dial includes a cylindrical body formed from a magnetic material having a cylindrical sidewall with an threaded outer surface, wherein the sidewall defines an axially extending passage for receiving a tubular insert formed from a substantially non-magnetic material, the insert having a closed first end and a second open end with a collar extending radially outward at the second open end and wherein the insert is secured in the passage with the closed first end adjacent the first end of the body.

20 Claims, 5 Drawing Sheets

U.S. PATENT DOCUMENTS

| | | |
|---|---|---|
| 1,937,231 A | 11/1933 | Klein |
| 2,198,055 A | 4/1940 | Liner |
| 2,311,387 A | 2/1943 | Hastings |
| 2,500,348 A | 3/1950 | De Giers et al. |
| 2,551,792 A | 5/1951 | De Giers et al. |
| 2,578,104 A | 12/1951 | Taylor |
| 2,584,446 A | 2/1952 | Hastings et al. |
| D172,372 S | 6/1954 | Wagner |
| 2,697,350 A | 12/1954 | Sorber |
| 2,705,970 A | 4/1955 | Orelind et al. |
| 2,795,955 A | 6/1957 | Hall |
| 2,799,348 A | 7/1957 | Page |
| 2,836,144 A | 5/1958 | Morphis |
| D187,084 S | 1/1960 | Gugloiotta |
| 2,992,560 A | 7/1961 | Morgan et al. |
| 3,012,437 A | 12/1961 | Clark et al. |
| D196,808 S | 11/1963 | Hoff |
| 3,112,464 A | 11/1963 | Ratajski et al. |
| 3,132,311 A | 5/1964 | Boddy |
| 3,132,331 A | 5/1964 | Boddy |
| 3,256,907 A | 6/1966 | Clark et al. |
| 3,320,806 A | 5/1967 | Johnson et al. |
| 3,320,813 A | 5/1967 | Taylor et al. |
| 3,320,922 A | 5/1967 | Taylor et al. |
| 3,320,923 A | 5/1967 | Taylor et al. |
| 3,339,519 A | 9/1967 | Taylor et al. |
| 3,351,821 A | 11/1967 | Blackett |
| 3,364,321 A | 1/1968 | Gessner |
| D213,192 S | 1/1969 | Hastings |
| 3,463,843 A | 8/1969 | Taylor et al. |
| 3,681,753 A | 8/1972 | Whalen et al. |
| 3,688,795 A | 9/1972 | Taylor |
| 3,703,246 A | 11/1972 | Horak |
| 3,709,038 A | 1/1973 | Werner |
| 3,710,612 A | 1/1973 | Innes et al. |
| 3,739,641 A | 6/1973 | Taylor et al. |
| 3,742,243 A | 6/1973 | Gamble |
| 3,777,273 A | 12/1973 | Baba et al. |
| 3,806,851 A | 4/1974 | McCormick |
| 3,826,139 A | 7/1974 | Bachman |
| D233,569 S | 11/1974 | Miller |
| D233,836 S | 12/1974 | Raffler et al. |
| 3,859,651 A | 1/1975 | Thomas, Jr. |
| 3,901,079 A | 8/1975 | Vogel |
| D240,227 S | 6/1976 | Flynn |
| 3,965,454 A | 6/1976 | Puerner |
| 3,986,109 A | 10/1976 | Poduje |
| 4,064,907 A | 12/1977 | Billington et al. |
| 4,086,533 A | 4/1978 | Ricouard et al. |
| 4,102,191 A | 7/1978 | Harris |
| 4,107,998 A | 8/1978 | Taylor |
| 4,114,130 A | 9/1978 | Sutton et al. |
| 4,125,821 A | 11/1978 | Masuda |
| 4,155,340 A | 5/1979 | Fernquist et al. |
| 4,223,190 A | 9/1980 | Olson |
| 4,293,837 A | 10/1981 | Jaffe et al. |
| 4,355,363 A | 10/1982 | Colby et al. |
| 4,362,056 A | 12/1982 | Lee |
| 4,383,444 A | 5/1983 | Beaman et al. |
| 4,387,334 A | 6/1983 | Loper |
| 4,392,375 A | 7/1983 | Eguchi et al. |
| 4,395,695 A | 7/1983 | Nakamura |
| 4,402,209 A | 9/1983 | Di Domenico |
| 4,416,211 A | 11/1983 | Hoffman |
| 4,417,473 A | 11/1983 | Tward et al. |
| 4,418,340 A | 11/1983 | Maeshiba |
| 4,425,557 A | 1/1984 | Nakamura |
| 4,430,634 A | 2/1984 | Hufford et al. |
| 4,441,364 A | 4/1984 | Montie |
| 4,480,469 A | 11/1984 | Tice |
| 4,483,367 A | 11/1984 | Ross, Jr. et al. |
| 4,507,961 A | 4/1985 | Stradella |
| 4,532,491 A | 7/1985 | Rau et al. |
| 4,543,730 A | 10/1985 | Scott |
| 4,545,020 A | 10/1985 | Brasfield |
| 4,567,763 A | 2/1986 | Schiffbauer |
| 4,570,118 A | 2/1986 | Tomczak et al. |
| 4,575,929 A | 3/1986 | Bleeke |
| 4,580,450 A | 4/1986 | Ota et al. |
| 4,589,077 A | 5/1986 | Pope |
| 4,590,575 A | 5/1986 | Emplit |
| 4,595,301 A | 6/1986 | Taylor |
| D285,332 S | 8/1986 | Trinkwalder |
| 4,605,038 A | 8/1986 | Tchitdjian |
| 4,610,165 A | 9/1986 | Duffy et al. |
| 4,617,512 A | 10/1986 | Horner |
| 4,635,480 A | 1/1987 | Hrncir et al. |
| 4,641,122 A | 2/1987 | Hennequin |
| 4,667,711 A | 5/1987 | Draft |
| 4,671,121 A | 6/1987 | Schieler |
| 4,688,028 A | 8/1987 | Conn |
| 4,688,587 A | 8/1987 | Bourgeon |
| 4,703,261 A | 10/1987 | Berchtold |
| 4,709,225 A | 11/1987 | Welland et al. |
| 4,719,419 A | 1/1988 | Dawley |
| 4,731,730 A | 3/1988 | Hedrick et al. |
| 4,782,215 A | 11/1988 | Kadwell et al. |
| 4,796,469 A | 1/1989 | Brown et al. |
| 4,806,847 A | 2/1989 | Atherton et al. |
| 4,812,804 A | 3/1989 | Masaki |
| 4,825,070 A | 4/1989 | Arimura |
| 4,835,509 A | 5/1989 | Yoshino et al. |
| 4,841,771 A | 6/1989 | Glover et al. |
| 4,864,273 A | 9/1989 | Tsuzuki et al. |
| 4,911,011 A | 3/1990 | Fekete et al. |
| 4,922,081 A | 5/1990 | Kadwell et al. |
| 4,924,704 A | 5/1990 | Gaston |
| 4,928,526 A | 5/1990 | Weaver |
| 4,931,764 A | 6/1990 | Gaston |
| 4,939,932 A | 7/1990 | Ritzenthaler et al. |
| 4,943,791 A | 7/1990 | Holce et al. |
| D311,572 S | 10/1990 | Burns |
| 4,967,181 A | 10/1990 | Iizuka et al. |
| D313,949 S | 1/1991 | Fekete |
| 4,987,400 A | 1/1991 | Fekete |
| 4,991,436 A | 2/1991 | Roling |
| 5,023,806 A | 6/1991 | Patel |
| 5,027,871 A | 7/1991 | Guenther |
| 5,050,433 A | 9/1991 | Lumetta |
| 5,051,921 A | 9/1991 | Paglione |
| D320,842 S | 10/1991 | Roman |
| 5,055,781 A | 10/1991 | Sakakibara et al. |
| 5,072,618 A | 12/1991 | Taylor et al. |
| 5,085,078 A | 2/1992 | Baux et al. |
| 5,092,230 A | 3/1992 | Bronnert |
| 5,103,368 A | 4/1992 | Hart |
| 5,117,693 A | 6/1992 | Duksa |
| 5,121,109 A | 6/1992 | Murphy, Jr. et al. |
| 5,140,303 A | 8/1992 | Meyer |
| 5,152,170 A | 10/1992 | Liu |
| 5,159,268 A | 10/1992 | Wu |
| 5,164,668 A | 11/1992 | Alfors |
| 5,191,284 A | 3/1993 | Morettis et al. |
| 5,216,919 A | 6/1993 | Nelson et al. |
| 5,265,032 A | 11/1993 | Patel |
| 5,270,645 A | 12/1993 | Wheeler et al. |
| 5,272,918 A | 12/1993 | Gaston et al. |
| 5,294,917 A | 3/1994 | Wilkins |
| 5,300,883 A | 4/1994 | Richeson |
| 5,305,639 A | 4/1994 | Pontefract |
| 5,311,776 A | 5/1994 | Morris |
| RE34,679 E | 8/1994 | Ritzenthaler et al. |
| 5,333,499 A | 8/1994 | Gaston |
| 5,341,679 A | 8/1994 | Walkowski et al. |

| | | |
|---|---|---|
| D350,297 S | 9/1994 | Weisel |
| 5,351,387 A | 10/1994 | Iwata et al. |
| 5,357,815 A | 10/1994 | Williamson |
| 5,375,467 A | 12/1994 | Banse |
| 5,438,869 A | 8/1995 | Mueller et al. |
| 5,444,369 A | 8/1995 | Luetzow |
| 5,463,314 A | 10/1995 | Mueller et al. |
| D363,888 S | 11/1995 | Williamson |
| 5,479,820 A | 1/1996 | Fekete |
| 5,570,118 A | 10/1996 | Rezanka et al. |
| D378,284 S | 3/1997 | Grilk et al. |
| 5,608,386 A | 3/1997 | Murphy, III et al. |
| D379,316 S | 5/1997 | Williamson |
| 5,670,876 A | 9/1997 | Dilger et al. |
| 5,672,818 A | 9/1997 | Schaefer et al. |
| D386,997 S | 12/1997 | Williamson |
| D387,295 S | 12/1997 | Krikorian |
| 5,701,932 A | 12/1997 | Bourscheid et al. |
| 5,712,561 A | 1/1998 | McCurley et al. |
| 5,743,136 A | 4/1998 | Gaston et al. |
| 5,746,088 A | 5/1998 | Sawert et al. |
| 5,756,876 A | 5/1998 | Wetzel et al. |
| 5,757,179 A | 5/1998 | McCurley et al. |
| 5,765,434 A | 6/1998 | Harbaugh |
| D397,306 S | 8/1998 | Ross, Jr. |
| 5,790,422 A | 8/1998 | Power et al. |
| 5,798,639 A | 8/1998 | McCurley et al. |
| D397,630 S | 9/1998 | Clifton |
| D397,631 S | 9/1998 | Riegel |
| 5,800,221 A | 9/1998 | Dombrowski et al. |
| D399,444 S | 10/1998 | Ross, Jr. |
| 5,838,241 A | 11/1998 | Lease et al. |
| D402,220 S | 12/1998 | Clifton |
| 5,850,142 A | 12/1998 | Rountos et al. |
| 5,936,613 A | 8/1999 | Jaeger et al. |
| D413,826 S | 9/1999 | Housey et al. |
| 5,955,881 A | 9/1999 | White et al. |
| 5,959,525 A | 9/1999 | Black et al. |
| D414,711 S | 10/1999 | Hrncir |
| 5,963,124 A | 10/1999 | Buss et al. |
| 5,982,170 A | 11/1999 | McCurley et al. |
| 5,998,892 A | 12/1999 | Smith et al. |
| D419,091 S | 1/2000 | Pattison et al. |
| 6,016,697 A | 1/2000 | McCulloch et al. |
| 6,018,241 A | 1/2000 | White et al. |
| 6,040,756 A | 3/2000 | Kaijala |
| 6,041,650 A | 3/2000 | Swindler et al. |
| 6,064,197 A | 5/2000 | Lochmann et al. |
| 6,089,086 A | 7/2000 | Swindler |
| D430,050 S | 8/2000 | Housey et al. |
| 6,101,873 A | 8/2000 | Kawakatsu et al. |
| D431,483 S | 10/2000 | Housey |
| 6,127,916 A | 10/2000 | Cooper et al. |
| D440,925 S | 4/2001 | Pfeiffer |
| D440,994 S | 4/2001 | Ross, Jr. |
| 6,220,096 B1 | 4/2001 | Gutierrez et al. |
| 6,253,611 B1 | 7/2001 | Varga et al. |
| 6,265,883 B1 | 7/2001 | Clark |
| 6,305,220 B1 | 10/2001 | Brunel |
| 6,312,074 B1 | 11/2001 | Walker |
| 6,380,750 B1 | 4/2002 | Schenck, Jr. et al. |
| 6,443,006 B1 | 9/2002 | DeGrave |
| 6,479,981 B2 | 11/2002 | Schweitzer et al. |
| 6,497,145 B1 | 12/2002 | Ross, Jr. |
| 6,523,406 B2 | 2/2003 | Housey et al. |
| 6,530,293 B1 | 3/2003 | Ruckert et al. |
| 6,564,632 B2 | 5/2003 | Ross, Jr. |
| 6,584,838 B2 | 7/2003 | Lorenzen |
| 6,614,242 B2 | 9/2003 | Matter et al. |
| 6,675,648 B2 | 1/2004 | Housey et al. |
| 6,679,116 B2 | 1/2004 | Ross, Jr. |
| 6,724,201 B2 | 4/2004 | Sato et al. |
| 6,762,679 B1 | 7/2004 | Diaz |
| D519,049 S | 4/2006 | Kim |
| 7,043,983 B2 * | 5/2006 | Fling et al. ............... 73/313 |
| D538,693 S | 3/2007 | Ross et al. |
| D539,685 S | 4/2007 | Ross et al. |
| 7,219,686 B2 | 5/2007 | Schmitz et al. |
| 7,293,578 B2 | 11/2007 | Swindler et al. |
| 2003/0084720 A1 * | 5/2003 | Ross, Jr. ............... 73/317 |
| 2004/0154393 A1 | 8/2004 | Taylor et al. |

FOREIGN PATENT DOCUMENTS

| | | |
|---|---|---|
| DE | 43 00 383 A1 | 7/1994 |
| DE | 197 46 276 A1 | 4/1999 |
| DE | 197 54 521 A1 | 6/1999 |
| EP | 0 101 580 A1 | 2/1984 |
| EP | 0 010 580 B1 | 12/1986 |
| EP | 0578299 A1 | 1/1994 |
| EP | 0593085 A1 | 4/1994 |
| EP | 0 895 068 A2 | 3/1999 |
| FR | 938617 A | 10/1948 |
| FR | 2 661 498 A1 | 10/1991 |
| GB | 1177805 A | 3/1967 |
| GB | 1 380 031 A | 5/1973 |
| GB | 2 043 259 A | 11/1979 |
| WO | 01/79789 A2 | 10/2001 |
| WO | 01/79789 A3 | 10/2001 |

OTHER PUBLICATIONS

Rochester Gauges, Inc., Senior EZ-Read TwinSite.TM. Sender for Industrial Service Technical Data Sheet TS002, Mar. 25, 1994, 2 pages.

Rochester Gauges, Inc., "Junior.RTM. EZ-Read TwinSite.TM. Two-Terminal Sender," May 27, 1992, 2 pages.

Rochester Gauges, Inc., Junior EZ-Read TwinSite.TM. Sender for Industrial Service Technical Data Sheet TS003, Mar. 25, 1994, 2 pages.

Rochester Gauges, Inc. Voltage-Divider TwinSite.TM. Sender Technical Data Sheet VD001, Jan. 21, 1994, 2 pages.

Rochester Gauges, Inc., TwinSite.TM. Switch Technical Data Sheet VD002, Jan. 21, 1994, 2 pages.

Rochester Gauges, Inc., Magnetic Liquid-Level Gauges for LP-Gas Service, 7300 Series, Technical Data Sheet, Not Dated, 2 pages.

Rochester Gauges, Inc., "The One Gauge, Adjustable Liquid Level Gauge", Technical Data Sheet 49S, Not Dated, 2 pages.

Rochester Gauges, Inc., "Magnetic Liquid Level Gauges for L.P. Gas Service", Technical Data Sheet 7200/B7200, May 27, 1992, 2 pages.

Rochester Gauges, Inc., Rochester Industrial Level Gauges Brochure, Aug. 1993, (excerpt) 1 page.

Rochester Gauges, Inc., A6200 Series (Brochure), Not Dated, 1 page.

C-Level Gauges (Brochure), Rochester Gauges, Inc., Not Dated, 2 pages.

Rochester Gauges, Inc., Rough Rider Advertisement, Not Dated, 1 page.

Rochester Gauges, Inc., Drawing No. M6339-11, Mar. 12, 1973, 1 page.

Lemoff, Thomas C., P.E., "Liquified Petroleum Gases Handbook", Fourth Edition, National Fire Protection Association, Quincy, MA, 1995, 9 pages.

"Series 353 Sensor Brings New Accuracy to Fuel Gauges", CTS Corp., Internet Article: http://www.ctscorp.com/techtalk/issue4/fuelgauge.htm, Nov. 11, 2000, 2 pages.

PCT: International Search Report of PCT/US99/14059; International Publication No. WO 2000/002015; Jul. 18, 2000; 2 pgs.

PCT: International Search Report of PCT/US07/76256; International Publication No. WO 2008/022340; Sep. 19, 2008; 1 pg.

PCT: Written Opinion of the International Searching Authority of PCT/US07/76256; International Publication No. WO 2008/022340; Sep. 19, 2008; 5 pgs.

PCT: International Search Report of PCT/US00/07668; International Publication No. WO 2000/060321; Jul. 24, 2000; 3 pgs.

* cited by examiner

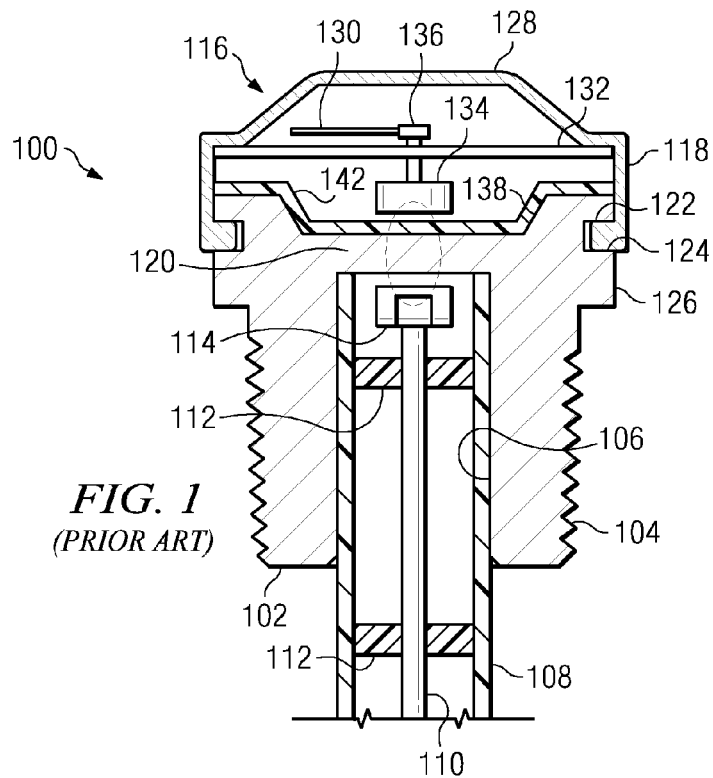
FIG. 1
(PRIOR ART)
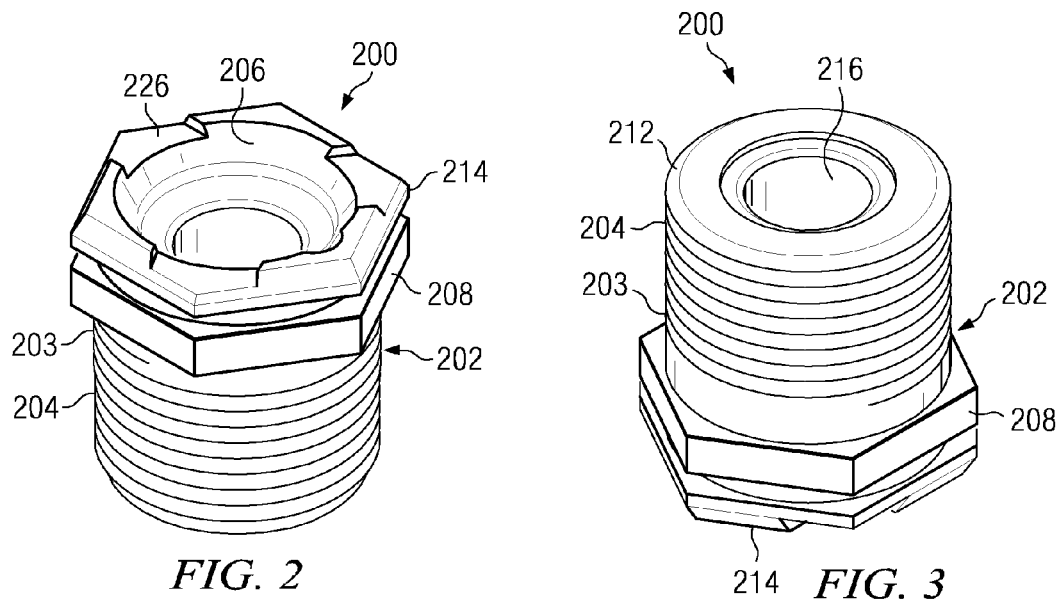
FIG. 2
FIG. 3

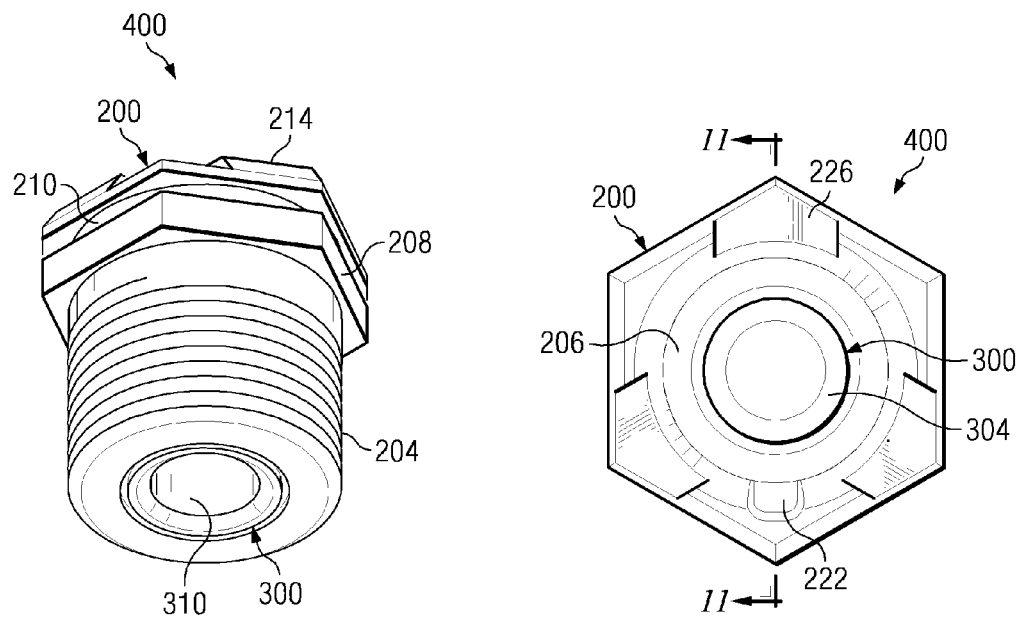
FIG. 9
FIG. 10
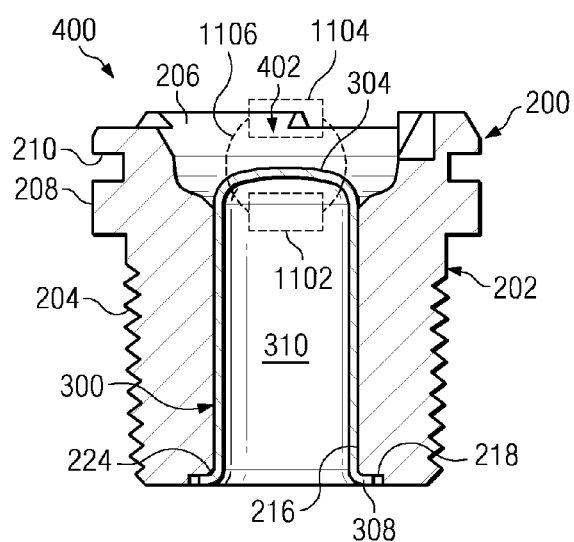
FIG. 11

GAUGE HEAD ASSEMBLY WITH NON-MAGNETIC INSERT

TECHNICAL FIELD

The invention relates to gauge heads for use in connection with magnetically coupled indicator dials, and more particularly, to pressure-resistant gauge heads used for liquid level gauges.

BACKGROUND

The use of magnetically-actuated indicator dials with float-type liquid level gauges is known. A receiving magnet connected to a dial indicator is magnetically coupled (typically through a gauge head) to a second magnet that moves in response to a change in liquid level in the tank. Such gauges are used with liquefied petroleum gases such as propane, butane and the like referred to herein as LPG. One such gauge is disclosed in U.S. Pat. No. 6,041,650 issued Mar. 28, 2002 to Swindler et al., the disclosure of which is incorporated herein by reference for all purposes.

A major advantage of magnetically actuated dials is that such dials do not require a mechanical coupling extending through the wall of a tank. However, the magnetic field of the receiving magnet must freely interact with the magnetic field of the second magnet. Thus, the material separating the receiving magnet from the second magnet must be substantially non-magnetic. For purposes of this application, the term "non-magnetic" refers to materials having a relative magnetic permeability (compared to vacuum), $\mu_r$, similar to that of non-ferrous metal materials such as aluminum, copper, zinc, brass, and austenitic stainless steels, and substantially lower than that of ferrous metal materials. Consequently, prior art gauge heads have been fabricated from non-magnetic materials, typically brass. These gauge heads are typically fabricated as a single-piece unit adapted to be threadedly engaged with a corresponding fitting in the tank. These gauge heads are configured to receive a magnetically actuated dial on the exterior of the tank with a second magnet mechanically coupled to a float assembly inside the tank.

For a variety of reasons, e.g., material cost, a single-piece gauge head fabricated entirely from a non-magnetic material is not always desirable. Thus, there exists a need for a gauge head that can be fabricated in part from a ferrous metal material that still provides a low magnetic permeability "window" through which the receiving magnet of a magnetic dial and a second magnet can be magnetically coupled.

SUMMARY

In one aspect thereof, a gauge head assembly includes a generally cylindrical body formed from a ferrous metal material having first and second ends with a first, axially extending annular recess formed in the first end thereof. The body includes a generally cylindrical sidewall having a threaded outer surface. The sidewall defines an axially extending passage opening into the first recess and extending through the body and the second end. A second, axially extending annular recess formed around the perimeter of the passage defines a shoulder extending around the circumference of the passage at the second end of the body. A substantially non-magnetic tubular insert adapted to be received in the passageway includes a cylindrical sidewall, a first closed end, a second open end and a collar extending radially outward at the second open end. The insert is disposed in the passage with the collar positioned in the second, axially extending annular recess and the first closed end extending into the first recess forming a window of low magnetic permeability in the body. The insert is permanently secured to the body with a gas-tight seal. In one embodiment, the gauge head is formed from a mild steel and the tubular insert is formed from stainless steel.

In another aspect, the gauge head assembly includes a circumferential groove extending around the outside perimeter of the body adjacent the first end adapted to receive the fingers of a magnetically actuated clip-on dial. In one embodiment, the gauge head assembly includes a plurality of wrench flats formed adjacent the first end of the body wherein the circumferential groove extends around the body through the wrench flats.

In another variation, the gauge head assembly of includes a plurality of wrench flats formed adjacent the first end of the body and a cylindrical end wall extending axially from the wrench flats including opposed cutouts formed therein. An axial screw hole is formed in the body in each of the opposed cutouts for securing the mounting tabs of a magnetically actuatable dial in the cutouts.

In one variation, a gauge head assembly for use with a magnetically actuated dial includes a generally cylindrical body having first and second ends with an axially extending first recess formed in the first end thereof, the recess having an inwardly sloping wall configured to receive the magnetically actuated dial therein. The body includes a generally cylindrical sidewall including a plurality of wrench flats formed adjacent the first end of the body and threaded outer surface wherein the sidewall defines an axially extending passage opening into the first recess. The passage extends through the body and the second end with an annular second recess formed around the perimeter of the passage. The second recess defines a shoulder extending around the circumference of the passage at the second end of the body. A tubular insert formed from a substantially non-magnetic material configured to be secured in the passage has a cylindrical sidewall defining a magnet receiving chamber. The tubular insert includes a first closed end positioned in the first annular recess and a second open end. The insert also includes an integral collar extending radially outward at the second open end, such that the insert is secured in the passage with the collar abutting the shoulder. In one variation, the gauge head assembly includes a circumferential groove extending around the outside perimeter of the body adjacent the first end that is adapted to receive the fingers of a clip-on type magnetically actuated dial. In another, the assembly is configured to receive a magnetically actuated dial having mounting tabs. In this variation, a plurality of axially extending screw holes are formed in the body adjacent the first annular recess. In one variation, the insert is secured in the passage by brazing. In another, the insert is secured in the passage with threads or is press fitted into the passage.

In one variation, the first closed end of the insert is domed shaped and extends into the first annular recess. In another, a locating feature or notch is formed in the first end of the body adjacent the recess for engaging a corresponding locating feature of a magnetic dial.

In another embodiment, a gauge head assembly includes a generally cylindrical body formed from a ferrous metal material having first and second ends with a first, axially extending recess formed in the first end thereof, the first recess having a first, sloping sidewall and a second, arcuate sidewall. The body has a threaded outer surface and a passage that opens into the first end and extends axially from the first recess through the body and the second end. In one variation, a plurality of wrench flats are formed adjacent the first end. A second, axially extending recess formed around the perimeter of the passage at the second end defines an arcuate shoulder extending around the circumference of the passage. A tubular insert formed from a substantially non-magnetic material is secured in the passage by means of brazing, welding soldering, press fitting or with threads. The insert is formed with a cylindrical sidewall, a first, domed shaped closed end and a second open end having a collar that opens radially outward at the second open end. The insert is positioned in the passage so that the collar abuts the shoulder with the domed-shaped closed end of the insert extending into the first recess. In this configuration, the insert forms a window of low magnetic permeability through the gauge head assembly at the domed-shaped first end adjacent the first end of the gauge assembly. In one variation, the body is formed from a mild carbon steel and the insert is formed from a stainless steel.

In yet another embodiment, a method of forming a gauge head assembly for use with a magnetic dial is disclosed. The method comprises the step of forming a gauge head of ferrous metal. The gauge head has a generally cylindrical body that has first and second ends. A passage extends therethrough that has a first, axially extending annular recess formed in the first end thereof and a second, axially extending annular recess formed around the perimeter of the passage. The second annular recess defines a shoulder that extends around the circumference of the passage at the second end of the body. The method further comprises the step of forming a tubular stainless steel insert that has a first closed end and a second open end. The second end defines a shoulder that conforms to the profile of the shoulder in the second annular recess. The method further comprises the steps of annealing the insert and positioning the insert in the passage. The method also includes the step of brazing the insert in the passage to form a gas tight seal between the insert and the body. In one variation, the steps of annealing and brazing are done separately. In another variation, the steps of annealing and brazing are done simultaneously.

BRIEF DESCRIPTION OF THE DRAWINGS

For a more complete understanding, reference is now made to the following description taken in conjunction with the accompanying Drawings in which:

FIG. 1 is a partial sectional view of a prior art gauge assembly including a gauge head and magnetically actuatable dial;

FIG. 2 and FIG. 3 are perspective views of a gauge head according to the disclosure;

FIG. 9 is a perspective view of a gauge head assembly according to the disclosure;

FIG. 10 is a top view of the gauge head assembly of FIG. 9;

FIG. 11 is a sectional view of the gauge head assembly of FIG. 9 taken along lines 11-11 of FIG. 10;

DETAILED DESCRIPTION

Figure 4:
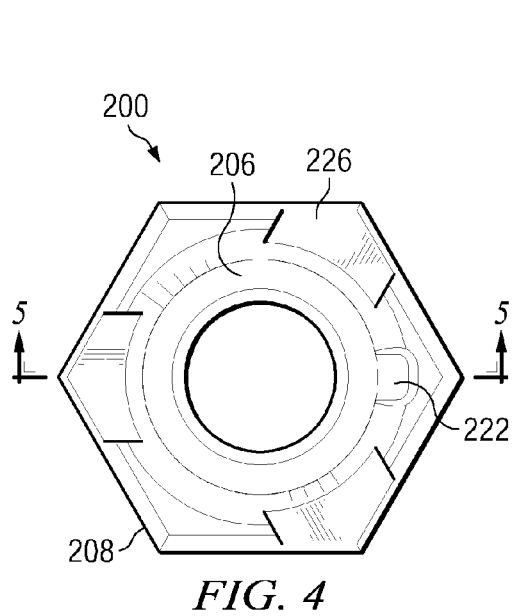
FIG. 4 is a top view of the gauge head of FIG. 3.

Referring now to the drawings, wherein like reference numbers are used herein to designate like elements throughout, the various views and embodiments of a gauge head assembly with non-magnetic insert are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a partial sectional view of a prior art float type liquid level gauge assembly 100. Gauge assembly 100 includes a gauge head 102 having a threaded lower portion 104 adapted to be threadedly engaged with a corresponding fitting in a tank such as an LPG tank. Prior art gauge head 102 is fabricated as a one piece unit from a substantially non-magnetic material such as brass. Gauge head 102 includes a cylindrical opening 106 that extends axially from a lower end of the gauge head upwardly to a wall 120 adjacent an annular recess 138 formed in the upper end 126 of the gauge head. A tubular support 108 for a float assembly (not shown) is press fitted or otherwise secured in cylindrical opening 106. A shaft 110 is rotatably secured in support 108 by means of bushings 112. Shaft 110 is coupled to the float assembly which rotates the shaft in response to a change in the liquid level in the tank on which the gauge assembly is mounted. A magnet 114 is mounted on the distal end of shaft 110 adjacent wall 120. A magnetically actuated clip-on dial 116 having a non-magnetic case 118 is mounted in recess 138 at the upper end 126 of gauge head 102. Case 118 is typically formed from a suitable plastic material.

Dial 116 includes a transparent lens 128, a dial face 132 and a pointer 130. Pointer 130 is connected to a receiving magnet 134 with a shaft 136 that extends through dial face 132. Receiving magnet 134 is positioned behind dial face 132 in magnet housing 142. In the illustrated embodiment, magnet housing 142 is an extension of non-magnetic case 118. Dial 116 is secured to gauge head 102 by means of a plurality of fingers 122 that are engaged in a circumferential groove 124 that extends around the circumference of the upper end 126 of the gauge head. The magnetic flux field of the receiving magnet 134 (represented by dotted lines) interacts with the magnetic flux field of magnet 114 through wall 120, thereby magnetically coupling the two magnets. Thus, rotation of shaft 110 and magnet 114 causes identical rotation of magnet 134, shaft 136 and dial pointer 130, thereby indicating the level of fluid in the tank, e.g., by markings on dial face 132.

FIGS. 2-11 illustrate a new gauge head assembly in accordance with this disclosure. As further described below, the new gauge head assembly comprises a gauge head and an insert which are formed separately and then assembled. The new gauge head assembly will operate with prior-art style magnetically coupled dials (e.g., dial 116) without modification.

FIG. 2 is a perspective view of a gauge head 200 in accordance with the present disclosure. Gauge head 200 comprises a body 202 having a generally cylindrical side wall 203 with a lower threaded portion 204. In one embodiment, body 202 is fabricated from a ferrous metal material such as mild carbon steel. In a preferred embodiment, the body 202 is a steel forging. Preferably, the relative magnetic permeability of the body 202 is greater than 200. In more preferred embodiments, the relative magnetic permeability of the body is greater than 1000, and in the most preferred embodiment, it is greater than 2500. Threaded portion 204 of body 202 is adapted to threadedly engage a corresponding fitting of a LPG tank to provide a gas tight seal. An axially extending annular recess 206 formed in the upper end 214 of gauge head 200 is configured to receive a magnetically actuatable dial such as dial 116 of FIG. 1. As illustrated, a plurality of pry slots 226 may be formed in the upper end of the gauge head adjacent recess 206. Pry slots 226 enable a user to insert a tool such as a flat head screwdriver into the slot to facilitate removal of a dial from the gauge head.

FIG. 3 is a second perspective view of gauge head 200. As illustrated, a cylindrical passage 216 extends axially through lower end 212 of body 202, opening into recess 206 in the upper end 214 of body 202. In one embodiment, a plurality of wrench flats 208 (FIG. 2) are formed around the circumference of upper end 214 of body 202. Wrench flats 208 enable a user to tighten gauge head 200 into a corresponding fitting of a tank or vessel.

FIG. 4 is a top view of gauge head 200. In the illustrated embodiment, an alignment feature or notch 222 is formed in a sidewall 228 (FIG. 5) of annular recess 206. Alignment feature 222 is configured to receive a corresponding feature, typically a pin, of a magnetically actuated dial to insure proper orientation of the dial relative to a float assembly.

Figure 5:
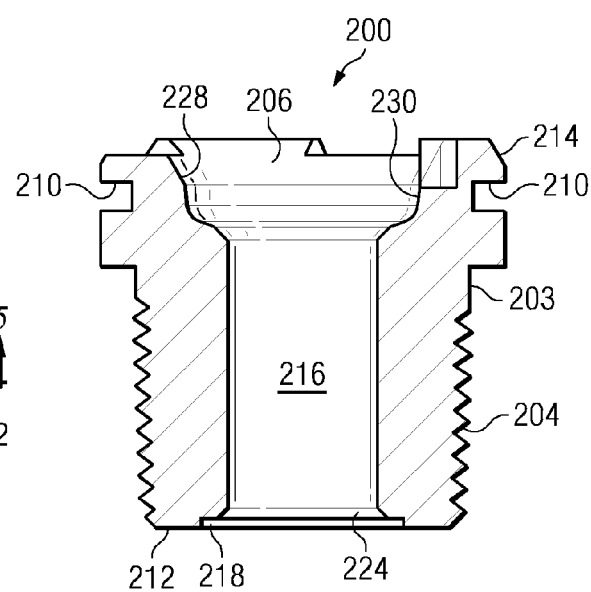
FIG. 5 is a sectional view of the gauge head of FIG. 3 taken along lines 5-5 of FIG. 4.

FIG. 5 is a sectional view of gauge head 200 taken along line 5-5 of FIG. 4. In the illustrated embodiment, a second, axially extending annular recess 218 is formed in lower end 212 of gauge head 202 around the perimeter of passage 216. Annular recess 218 defines a shoulder 224 extending between lower end 218 of body 200 and cylindrical passage 216. As illustrated, shoulder 224 has an arcuate profile; however, the profile of the shoulder may be sloped or squared.

Referring still to FIG. 5, recess 206 is defined by a first sloped cylindrical wall 228 formed in upper end 214 of gauge head 202. A second, arcuate sidewall wall 230 extends between sloped wall 228 and cylindrical passage 216. As illustrated, the diameter and cross-sectional area of recess 206 is substantially greater than that of cylindrical passage 216. In one embodiment, a circumferential groove 210 extends around the perimeter of upper end 214 through wrench flats 208. Groove 210 is adapted to receive the fingers of a clip-on type magnetically actuated dial such as dial 116 of FIG. 1.

Figure 6:
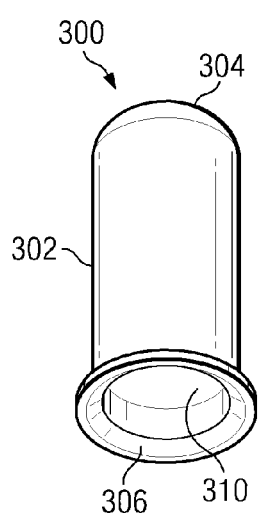
FIG. 6 and FIG. 7 are perspective views of an insert for use with the gauge head of FIG. 3.
Figure 7:
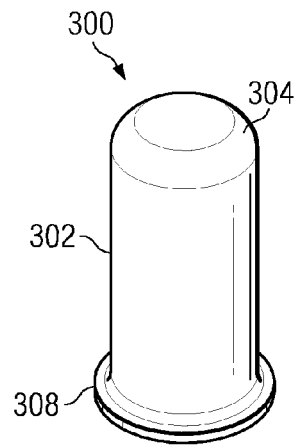

FIGS. 6 and 7 are first and second perspective views of a tubular insert 300 adapted for use with gauge head 200. Insert 300 includes a closed upper end 304, an open lower end 306 and a tubular side wall 302 extending therebetween. As illustrated, closed upper end 304 of insert 300 has a generally domed shaped profile. Insert 300 is formed from a substantially non-magnetic (e.g., very low magnetic permeability) material. Preferably, the relative magnetic permeability of the insert 300 is less than 6.0. In more preferred embodiments, the relative magnetic permeability of the insert 300 is less than 2.0, and in the most preferred embodiment, it is less than 1.25. In one embodiment, insert 300 is formed from a series 300 stainless steel such as 304, 304L, 316 or 316L. In other embodiments, other stainless steel alloys or non-ferrous metals such as brass, zinc, aluminum or copper may be used. As best illustrated in FIG. 7, a radially extending, outwardly opening collar 308 is formed around the circumference of open lower end 306 of the insert.

Figure 8:
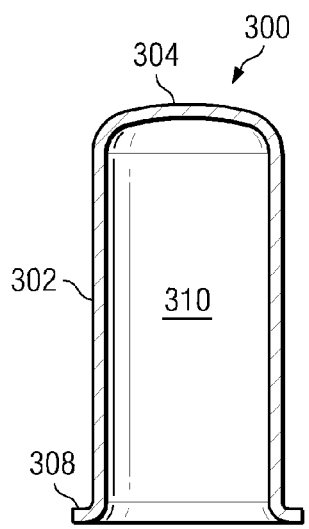
FIG. 8 is a lengthwise sectional view of the insert of FIG. 6.

FIG. 8 is a lengthwise sectional view of insert 300. As illustrated, cylindrical side wall 302 of insert 300 defines a receiving chamber 310 that opens through a collar 308. The receiving chamber 310 may be dimensioned to receive a gauge support tube (e.g., support 108 of FIG. 1) at its lower end and a magnet (e.g., magnet 114 in FIG. 1) at its upper end. Collar 308 has an arcuate or sloped profile configured to match the profile of shoulder 224 of gauge head 200. In one embodiment, the domed end 304, the wall 302 and the collar 308 are integrally formed on insert 300 by means of deep drawing or a similar forming process. In other embodiments, stamping, punching or other forming methods may be used to make insert 300.

Depending upon the material and process used to form insert 300, it may be necessary to anneal the insert after forming to ensure that it is sufficiently non-magnetic to be used in the gauge head assembly of the current disclosure. For example, the magnetic permeability of most stainless steel alloys will increase significantly (i.e., from a base level of all-austenitic stainless) if cold-worked or machined. Thus, insert 300 may initially become somewhat magnetic (i.e., well above the desired level of non-ferrous metals) if formed by deep drawing. Annealing the insert 300 after drawings returns the material to a desired non-magnetic state. As discussed further herein, the step of annealing the insert, if required, may be performed on the insert 300 alone (i.e., before insertion into the gauge head), or after the insert is inserted into the gauge head 200, e.g., while brazing the insert to the gauge head in an oven.

FIG. 9 is a perspective view of gauge head assembly 400 comprising gauge head 200 and insert 300. In one embodiment, insert 300 is secured in cylindrical passage 216 of gauge head 200 by means of high temperature brazing to form a gas-tight seal between insert 300 and body 202 of gauge head 200. Alternatively, passageway 216 of gauge head 200 and the exterior surface of cylindrical side wall 302 of insert 300 may be provided with threads such that insert 300 may be threadedly engaged in valve head 200. In yet another embodiment, insert 300 may be press fitted into passage way 216 of gauge head 200. As will be appreciated, in applications where gauge head assembly 400 is used on LPG tanks, it is important that the seal between insert 300 and body 202 be strong enough to prevent escape of compressed gases.

FIG. 10 is a top view of gauge head assembly 400. As illustrated, the dome-shaped closed end 304 of insert 300 extends into annular recess 206 of gauge head 200. In this configuration, closed upper end 304 of insert 300 forms a window 402 (FIG. 11) of low magnetic permeability material surrounded by the relatively high magnetic permeability material of the gauge head 200.

FIG. 11 is a sectional view of gauge head assembly 400 taken along line 11-11 of FIG. 10. As illustrated, outwardly opening collar 308 of insert 300 is secured in recess 218 with the collar in abutting relationship with shoulder 224 of gauge head 200. In this configuration, collar 308 serves to secure insert 300 against axially acting forces created by the pressure exerted by compressed gases in a tank on which assembly 400 is mounted.

As best seen in FIG. 11, the protrusion of end 304 of non-magnetic insert 300 through the center of the gauge head 200 forms a low magnetic permeability window 402 that facilitates the passage of localized magnetic fields therethrough even when the gauge head 200 is formed from a ferrous metal or other relatively high magnetic permeability material. Thus, when a first magnet 1102 (shown in dotted line) is disposed in the receiving chamber 310 of the insert 300 and a second magnet 1104 (shown in dotted line) disposed in the adjacent recess 206 of the gauge head 200, the respective magnetic fields 1106 (represented by dotted lines) can interact such that movement of the first magnet will cause substantially identical movement of the second magnet.

Figure 12:
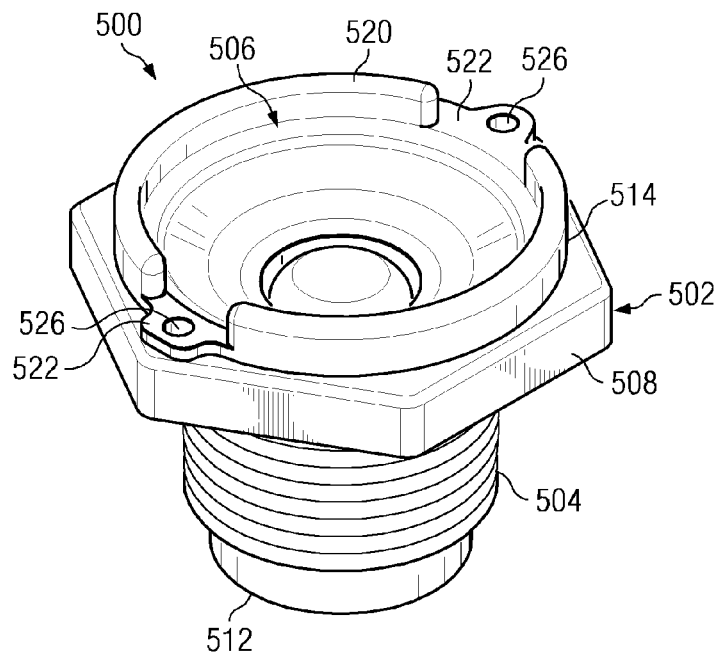
FIG. 12 is a perspective view of a second gauge head assembly according to the disclosure.

Referring now to FIG. 12 in another embodiment, a gauge head assembly 500 is configured to receive a magnetically actuated prior art dial (not shown) of the type similar to gauge 116 of FIG. 1, but having opposed mounting tabs that extend outward from the dial with holes for receiving screws therethrough. Assembly 500 includes a body 502, a threaded portion 504, and an annular recess 506 formed in an upper end 514 of body 502. Annular recess 506 is configured to receive the magnet housing of a magnetically actuated dial therein. A cylindrical end wall 520 extends axially from upper end 514 of body 502 adjacent wrench flats 508 and includes a pair of opposed openings or cut-outs 522 extending through the wall. Cut-outs 522 are configured to receive the mounting tabs of a magnetically actuated dial. A hole or aperture 526 is formed in body 502 in each of cut-outs 522. Holes 526 may be threaded or non-threaded and are configured to receive screws used to secure the mounting tabs of a dial on assembly 500. As illustrated two diametrically opposed cutouts 522 and two holes 526 are formed in body 502; however, a greater or lesser number of screw holes may be provided depending upon the particular dial to be secured to gauge head assembly 500. The size of the cutouts 522 may be varied to correspond with the size of the tabs on the dial for alignment purposes.

Figure 13:
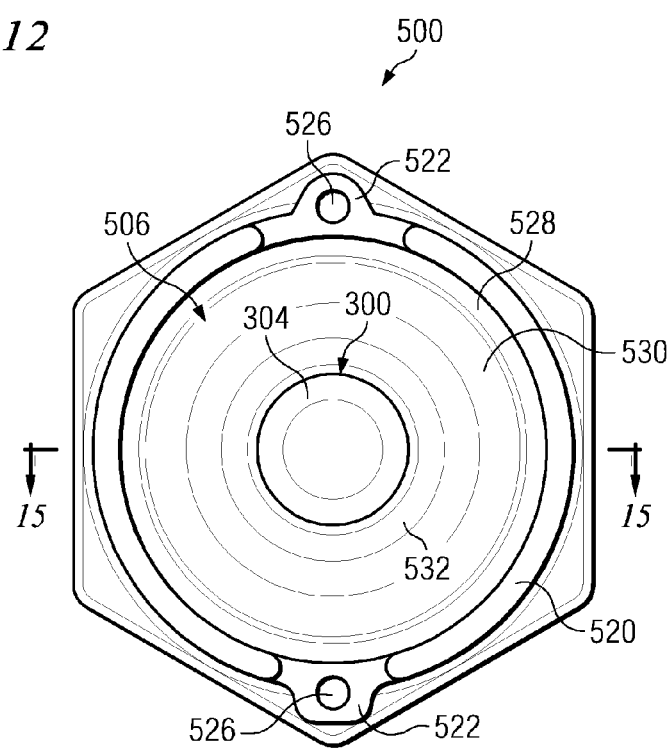
FIG. 13 is a top view of the gauge head assembly of FIG. 12.

FIG. 13 is a top view of gauge head assembly 500. As illustrated, domed upper end 304 of tubular insert 300 extends into recess 506. As previously described in connection with FIGS. 6-8, tubular insert 300 is formed from a substantially non-magnetic material such as a stainless steel. Assembly 500 is configured to receive a magnetically actuatable dial in recess 506 with the receiving magnet of the dial adjacent the upper end 304 of insert 300. Insert 300 is configured to receive a support member, shaft and magnet of a float-type liquid level indicator as illustrated and described in FIG. 1 with the magnet of the float assembly positioned adjacent end 304 of insert 300.

Figure 14:
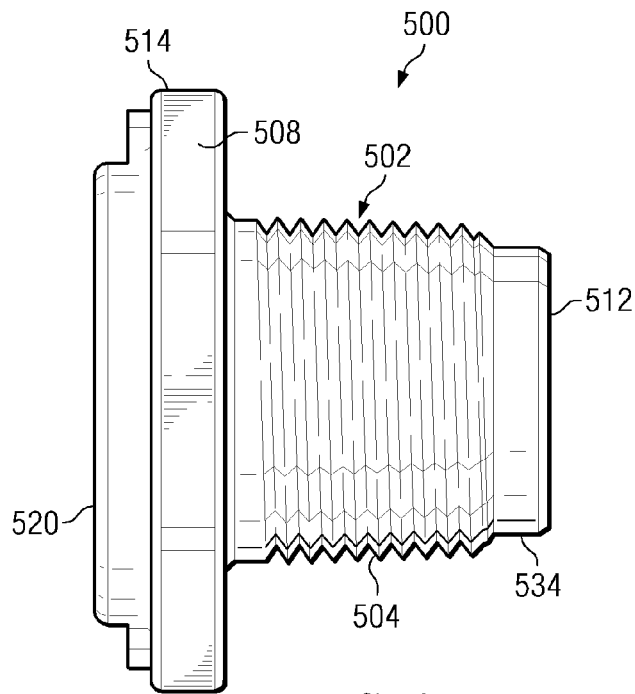
FIG. 14 is a side view of the gauge head assembly of FIG. 12.

FIG. 14 is a side view of gauge head assembly 500. As illustrated, body 502 includes a non threaded barrel portion 534 extending axially from threaded portion 514. In one variation, body 502 may be formed from a ferrous metal material. In one embodiment, body 502 is forged or machined from a mild steel.

Figure 15:
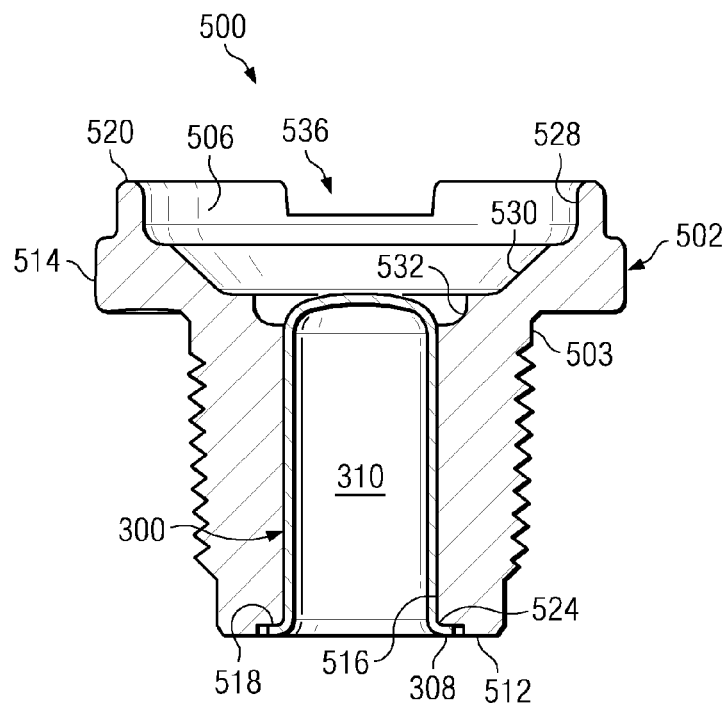
FIG. 15 is a sectional view of the gauge head assembly of FIG. 12 taken along lines 15-15 of FIG. 13.

FIG. 15 is a sectional view of gauge head assembly 500 taken along lines 15-15 of FIG. 13. As illustrated, body 502 includes a generally cylindrical sidewall 503 that defines an axially extending passageway 516 extending through the body. Passageway 516 extends through body 502, opening into recess 506 in upper end 514 of body 502. As illustrated, passageway 516 is configured to receive insert 300 therein with the closed upper end 304 of the insert extending into recess 506.

As illustrated, recess 506 is defined by an inner sidewall 528 of endwall 520, an inwardly sloping sidewall 530 and an arcuate sidewall 532. A second annular recess 518 formed around the perimeter of passageway 516 at lower end 512 receives collar 308 of insert 300 with the collar in an abutting relationship with shoulder 524. Insert 300 may be secured in passage 516 by means of brazing, soldering, welding, press fitting or may be threaded into the passage to form an air tight seal between the insert and the body 502.

Referring still to FIG. 15, in the illustrated embodiment, shoulder 524 has an arcuate profile that matches the profile of collar 308 of insert 300. Collar 308 serves to secure insert 300 against forces generated by compressed gas in a tank on which assembly 500 is mounted. In this configuration, closed upper end 304 of inset 300 forms a low magnetic permeability window 536 through which the flux of a rotating magnet such as magnet 114 of FIG. 1 may interact with the flux of a receiving magnet of a magnetically actuated dial.

It will be appreciated by those skilled in the art having the benefit of this disclosure that this gauge head with non-magnetic insert provides a gauge head assembly. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A gauge head assembly comprising:
    a generally cylindrical body formed from a ferrous metal material having first and second ends with a first, axially extending annular recess formed in the first end thereof;
    the body including a generally cylindrical sidewall having a threaded outer surface, the sidewall defining an axially extending passage opening into the first recess and extending through the body and the second end, the second end including a second, axially extending annular recess formed around the perimeter of the passage, the second annular recess defining a shoulder extending around the circumference of the passage at the second end of the body;
    a tubular insert, the tubular insert having a cylindrical sidewall, a first closed end and a second open end, the tubular insert further comprising a collar extending radially outward at the second open end, wherein the tubular insert is disposed in the passage with the collar positioned in the second annular recess and the first closed end extending into the first annular recess, and wherein the tubular insert is permanently secured to the body with a gas-tight seal; and
    wherein the tubular insert is formed from a substantially non-magnetic material.

2. The gauge head assembly of claim 1 wherein the non-magnetic material has a relative magnetic permeability (compared to vacuum) of less than 6.

3. The gauge head assembly of claim 2, wherein the non-magnetic material has a relative magnetic permeability of less than 2.

4. The gauge head assembly of claim 1 wherein the tubular insert is formed from stainless steel.

5. The gauge head assembly of claim 4, wherein the tubular insert is formed from an annealed stainless steel.

6. The gauge head assembly of claim 1, further comprising:
    a plurality of wrench flats formed adjacent the first end of the body; and
    a circumferential groove extending around the body through the wrench flats adapted to receive fingers of a clip-on dial indicator.

7. The gauge head assembly of claim 1 further comprising:
    a cylindrical end wall extending axially from the first end of the body;
    at least one cut-out formed in the cylindrical end wall, the cut-out adapted to receive a mounting tab of a dial; and
    a hole formed in the body in the cutout for securing a dial to the gauge head assembly with a screw extending through a mounting tab at a dial into said hole.

8. The gauge head assembly of claim 7 further comprising two opposed cut-outs formed in the cylindrical end wall.

9. A gauge head assembly for use with a magnetically actuated dial comprising:
- a generally cylindrical body formed from a ferrous metal material having first and second ends with a first axially extending annular recess formed in the first end thereof, the recess having an inwardly sloping wall configured to receive the magnetically actuated dial therein;
- the body including a generally cylindrical sidewall including a plurality of wrench flats formed adjacent the first end of the body and a threaded outer surface, wherein the sidewall defines an axially extending passage opening into the first recess and extending through the body and the second end, the second end including a second, axially extending annular recess formed around the perimeter of the passage, the second annular recess defining a shoulder extending around the circumference of the passage at the second end of the body;
- a tubular insert secured in the passage with a gas-tight seal, the insert having a cylindrical sidewall defining a magnet receiving chamber, a first closed end positioned in the first annular recess and a second open end, the insert further comprising a collar extending outward at the second open end, wherein the insert is secured in the passage with the collar abutting the shoulder in the second, axially extending annular recess and forming a gas-tight seal between the insert and the generally cylindrical body; and
- wherein the insert is formed from a substantially non-magnetic material.

10. The gauge head assembly of claim 9 further comprising a plurality of axially extending holes formed in the body adjacent the first annular recess, whereby mounting tabs of a dial may be secured to the gauge head assembly with screws.

11. The gauge head assembly of claim 9 wherein the tubular insert is secured in the body by brazing.

12. The gauge head assembly of claim 9 wherein the first closed end of the tubular insert is dome-shaped.

13. The gauge head assembly of claim 9 further comprising:
- a cylindrical end wall extending axially from the first end of the body;
- two opposed cut-outs formed in the cylindrical end wall, the cut-outs adapted to receive mounting tabs of a dial; and
- a hole formed in the body in each of the cutouts for securing a dial to the gauge head assembly with a screw extending through the mounting tab of a dial and into the hole.

14. A gauge head assembly comprising:
- a generally cylindrical body formed from a ferrous metal material having first and second ends with a first, axially extending recess formed in the first end thereof, the first recess having a first, sloping sidewall and a second, arcuate sidewall extending from the first sidewall;
- the body including a threaded outer surface and an axially extending passage opening into the first recess and extending through the body and the second end and a plurality of wrench flats formed adjacent the first end;
- a second, axially extending recess formed around the perimeter of the passage, the second annular recess defining an arcuate shoulder extending around the circumference of the passage at the second end of the body;
- a tubular insert secured in the passage, the insert formed from a substantially non-magnetic material and having a cylindrical sidewall, a first, domed-shaped closed end and a second open end, the insert further comprising a collar extending radially outward at the second open end, wherein the non-magnetic insert is permanently secured in the passage with the collar abutting the shoulder and the domed-shaped closed end extending into the first recess and wherein a gas-tight seal is formed between the tubular insert and the generally cylindrical body; and
- wherein the insert forms a window of low magnetic permeability through the gauge head assembly at the domed-shaped first end adjacent the first end of the generally cylindrical body of the gauge head assembly.

15. The gauge head assembly of claim 14 further comprising a locating feature formed in the first end adjacent the first recess.

16. The gauge head assembly of claim 14, further comprising:
- a cylindrical end wall extending axially from the first end of the body;
- at least one cut-out formed in the cylindrical end wall, the cut-out adapted to receive a mounting tab of a dial; and
- an axially extending hole formed in the body in the cutout for securing a dial to the gauge head assembly with a screw.

17. The gauge head assembly of claim 14, wherein the body is formed from a magnetic steel and wherein the insert is formed from a stainless steel.

18. A method of forming a gauge head assembly for use with a magnetic dial comprising:
- forming a gauge head of ferrous metal, the gauge head having a generally cylindrical body having a first and second ends, a passage extending therethrough with a first, axially extending annular recess formed in the first end thereof and a second, axially extending annular recess formed around the perimeter of the passage, the second annular recess defining a shoulder extending around the circumference of the passage at the second end of the body;
- forming a tubular stainless steel insert having a first closed end and a second open end, the second end defining a shoulder conforming to the profile of the shoulder in the second annular recess;
- annealing the insert;
- positioning the insert in the passage; and
- brazing the insert in the passage to form a gas-tight seal between the open end of the tubular insert and the body.

19. The method of claim 18, wherein the steps of annealing and brazing are done separately.

20. The method of claim 18, wherein the steps of annealing and brazing are done simultaneously.

* * * * *